United States Patent [19]

Sugano et al.

[11] Patent Number: 4,543,404
[45] Date of Patent: Sep. 24, 1985

[54] PRIMER COMPOSITION

[75] Inventors: Shunji Sugano; Koichi Hagiwara, both of Neagari; Isao Miura, Fukuoka; Akira Honto, Kanazawa, all of Japan

[73] Assignees: Negami Chemical Industrial Co., Ltd.; Toshiba Silicone Co., Ltd., both of Tokyo, Japan

[21] Appl. No.: 644,694

[22] Filed: Aug. 27, 1984

[51] Int. Cl.$^4$ ............................................. C08G 77/04
[52] U.S. Cl. ...................................... 528/26; 528/27; 528/28; 556/413; 556/414; 556/419; 204/159.13
[58] Field of Search ............................. 528/26, 27, 28; 556/413, 414, 419; 204/159.13

[56] References Cited

U.S. PATENT DOCUMENTS

| | | | |
|---|---|---|---|
| 4,478,990 | 10/1984 | Kohno et al. | 526/264 |
| 4,499,150 | 2/1985 | Dowbenko et al. | 528/26 |
| 4,499,151 | 2/1985 | Dowbenko et al. | 427/380 |

Primary Examiner—Melvyn I. Marquis
Attorney, Agent, or Firm—Antonelli, Terry & Wands

[57] ABSTRACT

There is disclosed a primer composition comprising [A] a reaction product of:
(1) a hydroxyl group-containing organic compound composed of;
(a) an epoxy group-containing alcohol represented by the general formula [I]:

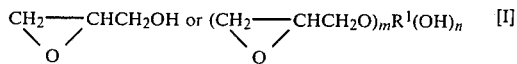

wherein, $R^1$ is a hydrocarbon group having 1 to 15 carbon atoms, or an organic group in which the same or different hydrocarbon groups are bonded to each other by an ether bond or an ester bond; and each of m and n is a value of 1 or more; and
(b) a hydroxyl group-containing (meth)acrylate represented by the formula [II]:

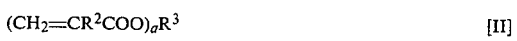

wherein $R^2$ is a hydrogen atom or a methyl group; $R^3$ is a substituted or unsubstituted hydrocarbon group, or a group in which the same or different hydrocarbon groups are bonded to each other by ether bond or the ester bond, the $R^3$ being a-valent and having at least one hydroxyl group; and a is an integer of 1 to 3; an amount of active hydrogen atoms included in the aforesaid (a) being 25 to 75% with respect to the total amount of active hydrogen atoms included in the aforesaid (1), and (2) a polyisocyanate including 70 to 100% of the theoretical amount of isocyanato groups which will react with the total amount of the active hydrogen atoms included in the aforesaid (1);

[B] an amino group-containing alkoxysilane or its partially hydrolyzed condensate having 0.5 to 1.5 amino active hydrogen atoms per epoxy group included in the aforesaid (1)(a); and

[C] a diluent.

8 Claims, No Drawings

PRIMER COMPOSITION

BACKGROUND OF THE INVENTION

This invention relates to a primer composition, more specifically to a primer composition which permits providing extremely good adhesion properties between the primer composition and each of a glass plate and an adhesive by previously applying the primer composition to the glass plate, when joining the glass plates is carried out with the adhesive.

Heretofore, as the primers used in causing the glasses to adhere to each other, there are known, for example, organic silicon compounds, i.e. silane coupling agents and their mixtures, which have carbon functional groups such as vinyl groups, amino groups, glycidoxy groups, methacyloxy groups and mercapto groups and in which silicon functional groups such as alkoxy groups, alkoxy-alkoxy groups and acetoxy groups are directly bonded to silicon atoms (e.g., Japanese Provisional Patent Publication No. 65232/1973). Although being excellent in the adhesion properties to the glass, these silane coupling agents are insufficient in an affinity for adhesive layers, depending upon kinds of adhesives. Therefore, they have the problems that a peel-off phenomenon occurs at the interfacial layer between the adhesive layer and the primer layer.

Further, another kind of primer is extensively known in which an epoxy resin and an amino group-containing alkoxysilane are employed together. However, such a primer has the drawback that it can not provide a sufficient adhesive strength, depending upon certain kinds of adhesives.

Furthermore, Japanese Provisional Patent Publication No. 120626/1983 discloses an active energy ray curing composition a film of which is formed on the surface of a substrate by the irradiation of active energy rays such as ultraviolet rays, a main component of the composition being an urethane polyacrylate obtained by the reaction of a hydroxyl group-containing epoxy compound which contains an aromatic hydrocarbon group and an ether bond or contains an aromatic, an alicyclic or an aliphatic hydrocarbon group and an ester bond in its molecular and which has a hydroxyl group as a side chain and an epoxy ring at a chain end; a polyisocyanate; and a hydroxyl group-containing (meth)acrylate. Such a composition just mentioned has the advantage that a treatment can be carried out in the absence of any solvent, but the adhesion of this composition to the substrate is not satisfactory, since it is dependent upon an amount of unreacted epoxy groups. Particularly, such a composition has the fault that its heat-resistant adhesion to the glass plate is poor.

SUMMARY OF THE INVENTION

Accordingly, an object of this invention is to provide a primer composition by which the above-mentioned problems are overcome and an excellent adhesion is established between the primer composition and each of the glass plate and the adhesive, when it is used in manufacturing glass-glass laminates or glass-polycarbonate laminates.

The inventors of this invention have intensively conducted researches into primer composition which are pretreatment agents for glasses used in preparing the glass-glass laminates or the glass-polycarbonate laminates by the use of a variety of adhesives, with the aim of improving the affinity of primer layers for adhesive layers. As a result, it has been found that on using a composition in which an epoxyurethane (meth)acrylate is blended with an amino group-containing alkoxysilane or its partially hydrolyzed condensate, (meth)acrylic double bonds present in the primer composition are reacted with double bonds present in the used adhesive, when the adhesive is cured by a low-temperature heating, ultraviolet rays or the like, so that a good adhesion can be obtained, and thus this invention has now been achieved.

That is to say, the primer composition of this invention is characterized by comprising

[A] a reaction product of:
(1) a hydroxyl group-containing organic compound composed of;
  (a) an epoxy group-containing alcohol represented by the general formula [I]:

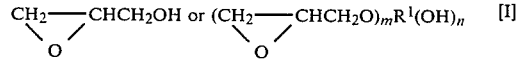

wherein, $R^1$ is a hydrocarbon group having 1 to 15 carbon atoms, or an organic group in which the same or different hydrocarbon groups are bonded to each other by an ether bond or an ester bond; and each of m and n is a value of 1 or more; and (b) a hydroxyl group-containing (meth)acrylate represented by the formula [II]:

wherein $R^2$ is a hydrogen atom or a methyl group; $R^3$ is a substituted or unsubstituted hydrocarbon group, or a group in which the same or different hydrocarbon groups are bonded to each other by ether bond or the ester bond, the $R^3$ being a-valent and having at least one hydroxyl group; and a is an integer of 1 to 3;
  an amount of active hydrogen atoms included in the aforesaid (a) being 25 to 75% with respect to the total amount of active hydrogen atoms included in the aforesaid (1); and (2) a polyisocyanate including 70 to 100% of the theoretical amount of isocyanato groups which will react with the total amount of the active hydrogen atoms included in the aforesaid (1);

[B] an amino group-containing alkoxysilane or its partially hydrolyzed condensate having 0.5 to 1.5 amino active hydrogen atoms per epoxy group included in the aforesaid (1)(a); and

[C] a diluent.

DESCRIPTION OF THE PREFERRED EMBODIMENTS

In the following, this invention will be further described in detail.

The epoxy group-containing alcohol (1)(a) serves to give the epoxy groups to the reaction product [A] and to thereby provide the composition with excellent adhesion properties to both the glass plate and the adhesive layer. In the general formula [I], $R^1$ represents a hydrocarbon group having 1 to 15 carbon atoms or an organic group in which the hydrocarbon groups are bonded to each other by an ether bond or an ester bond. Such hydrocarbon groups may be aromatic or aliphatic, and their examples include a hydroxyethyl group, a 2,3-dihydroxypropyl group, a 2,2-dimethylolbutyl group, a trimethylolethyl group, a 2-ethyl-2-methylolpropylene group, a 2,2-dimethylolpropylene group, a diglycerol group, a sorbitol group, and groups represented by the following formulae:

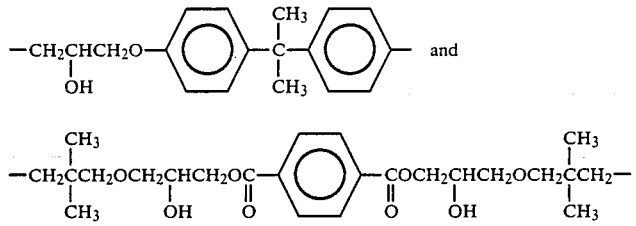

Further, in the formula, each of m and n is an integer of 1 or more.

Examples of such epoxy group-containing alcohols include, in addition to glycidol, ethylene glycol monoglycidyl ether, glycerin monoglycidyl ether, glycerin diglycidyl ether, trimethylolpropane monoglycidyl ether, trimethylolpropane diglycidyl ether, pentaerythritol monoglycidyl ether, pentaerythritol diglycidyl ether, pentaerythritol triglycidyl ether, diglycerol monoglycidyl ether, diglycerol diglycidyl ether, diglycerol triglycidyl ether, sorbitol triglycidyl ether, sorbitol tetraglycidyl ether, bisphenol A-diglycidyl ether-modified monoacrylate and compounds represented by the following formula:

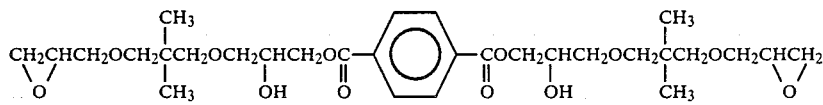

of the recited alcohols, those in which (a) is a glycidol or $R^1$ is an aliphatic hydrocarbon group are preferred, if it is desired that a cured primer film is elastic.

The hydroxyl group-containing (meth)acrylate (1)(b) is the component which react with the polyisocyanate of (2) in order to provide the primer composition with a property of curing by heating at a relatively low temperature or a light irradiation. $R^3$ in the general formula [II] represents an a-valent group having at least one hydroxyl group. This a-valent group is a substituted or unsubstituted hydrocarbon group having at least one hydroxyl group, or a group, having at least one hydroxyl group, in which the same or different hydrocarbon groups are bonded to each other by an ether bond or an ester bond. Examples of the $R^3$ include hydroxy group-containing hydrocarbon groups such as a hydroxyethyl group, a hydroxypropyl group, a glycerol group and a tetramethylolmethyne group; hydroxy group-containing hydrocarbon groups containing ether bond such as a hydroxybutoxypropoxy group and a hydroxyphenyloxypropoxy group; and hydroxy group-containing hydrocarbon groups containing ester bond such as a hydroxy-(meth)acryloyloxy group. These hydrocarbon groups may be substituted by halogen atoms or the like. If it is desired to provide the primer with physical properties, especially, elasticity after curing, the valence a is required to be within the range of 1 to 3. Examples of the hydroxyl group-containing (meth)acrylates include 2-hydroxyethyl acrylate, 2-hydroxypropyl acrylate, 3-hydroxypropyl acrylate, 2-hydroxy-3-chloropropyl acrylate, 2-hydroxy-3-butoxypropyl acrylate, 2-hydroxy-3-(meth)acryloyloxypropyl acrylate, 2-hydroxy-3-phenyloxy acrylate, 1,4-butylene glycol monoacrylate, glycerin monoacrylate, glycerin diacrylate, trimethylolpropane diacrylate, tetramethylolmethane triacrylate, triethylene glycol monoacrylate, polypropylene glycol monoacrylate and polycaprolactone glycol monoacrylate, and methacrylates corresponding to these acrylates.

The hydroxyl group-containing organic compound (1) is composed of (a) and (b). A formulating proportion of (a) and (b) is such that an amount of the active hydrogen atoms of (a) is within the range of 25 to 75% with respect to the total amount of the active hydrogen atoms which are included in (1) and will react with the isocyanate of (2). When the formulating amount of (a) is less than 25%, any sufficient adhesive strength will not be obtained. On the other hand, when it is more than 75%, any satisfactory curing state will not be obtained in the case that the curing is carried out by heating at a relatively low temperature or the irradiation of ultraviolet rays.

The polyisocyanate (2) can react with the hydroxyl groups of the above-mentioned (1)(a) and (b) in order to form an urethane acrylate oligomer [A] which is one of the main components of the primer composition. By way of such polyisocyanates, polyisocyanates used in usual urethanating reactions can be employed, but when an especially excellent light stability is required, it is preferred to employ a so-called non-yellowing type polyisocyanate. Examples of these polyisocyanates include tolylene diisocyanate, diphenylmethane diisocyanate, naphthalene diisocyanate, xylylene diisocyanate, hydrogenated xylylene diisocyanate, hexamethylene diisocyanate, trimethylhexamethylene diisocyanate, isophorone diisocyanate, methylene-bis(4-cyclohexyl isocyanate),

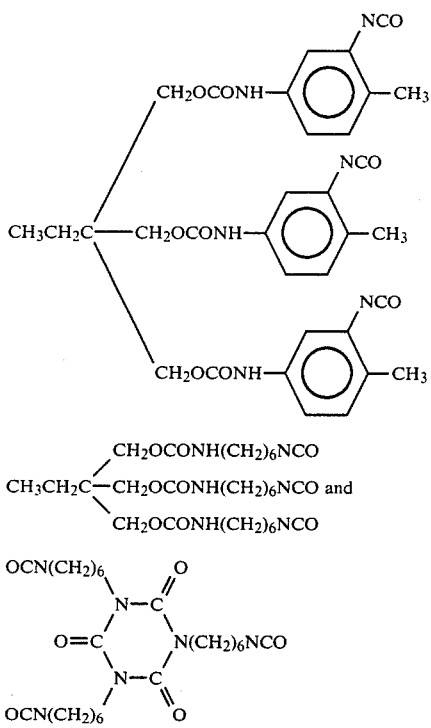

They may be employed alone or in any combination of two or more thereof.

A formulating proportion of (2) is such that the amount of the isocyanate groups included in the polyisocyanate is within the range of 70 to 100%, preferably 80 to 100% of a theoretical amount of the isocyanate groups which react with the total amount of the active hydrogen atoms included in (1)(a) and (b). When the amount of the isocyanate groups is less than 70% of the above-mentioned theoretical amount, the unreacted hydroxyl group-containing organic compound which has no reactivity with the adhesive will be great in amount, so that the adhesive strength of the primer composition to the glass plate or the adhesive will be deteriorated. On the other hand, when it is more than 100% of the theoretical amount, the excessive isocyanate groups will remain and will bring about a reaction with the amino groups of (b) which should react with epoxy groups, with the result that the adhesive strength will be lowered and a stability of the primer composition will be reduced during a storage period.

The above-mentioned component [A] can be prepared, for example, by adding dropwise (1)(a) and (b) separately or previously mixed (1)(a) and (b) to (2), or treating them in a temporary preparation manner, with stirring, but the way of adding dropwise (1)(a) and (b) separately is preferred, since the primer obtained in such a way will be excellent in the adhesive strength. The reaction for the manufacture of the component [A] can progress even at ambient temperature, but it is preferred to heat the materials up to 40° to 80° C. at the reaction. In this case, a reaction catalyst such as dibutyltin difatty acid salt and a polymerization inhibitor such as 2,4-di-tertbutyl-4-hydroxytoluene may be added thereto, if desired. Further, at the above-mentioned reaction, the diluent (C) not having active hydrogen atoms may be added thereto. After the completion of the dropwise addition, the stirring is further continued to bring the reaction to an end. The reaction time depends upon a kind of polyisocyanate but is preferably in the range of 1 to 30 hours. Moreover, in the case that the reaction catalyst is used, its amount depends upon a kind of polyisocyanate but is preferably in the range of 0 to 10% by weight, more preferably in the range of 0.001 to 2% by weight based on the total amount of component [A].

The amino group-containing alkoxysilane or its partially hydrolyzed condensate of [B] reacts with the epoxy groups of [A] in order to introduce a silicon-functionality into the primer composition and to thereby improve the adhesion to the glass plate. Examples of such amino group-containing alkoxysilanes or their partially hydrolyzed condensates include γ-aminopropyltrimethoxysilane, γ-aminopropyltriethoxysilane, N-(β-aminoethyl)-γ-aminopropyltrimethoxysilane, N-(β-aminoethyl)-γ-aminopropylmethyldimethoxysilane, γ-anilinopropyltrimethoxysilane and their partially hydrolyzed condensates, but they are not limited. Of these compounds, the amino group-containing alkoxysilanes, particularly N-(β-aminoethyl)-γ-aminopropyltrimethoxysilane is preferred, since a good adhesion to the glass plate and the adhesive is obtained thereby.

A formulating amount of [B] is such that the number of amino active hydrogen atoms included in [B] is 0.5 to 1.5, preferably, 0.8 to 1.2 per epoxy group included in (1)(a). When the number of the amino active hydrogen atoms is less than 0.5, a good adhesion to the glass plate and the adhesive can not be obtained; when the number is more than 1.5, its excess will be in vain, because the adhesion to the glass plate and the adhesive will not be improved in proportion to the number of the added amino active hydrogen atoms.

The primer composition of this invention is substantially composed of components [A] and [B], but for the purpose of lowering a viscosity of the composition to facilitate its application work, the diluent of [C] is further added thereto. Such a diluent may be a reactive material having functional groups which will bring about a reaction with the above-mentioned component [A] or [B], or a material having no functional groups. Examples of the diluents of having no functional groups include organic solvents, i.e., aromatic hydrocarbons such as toluene and xylene; alcohols such as methanol, ethanol, isopropanol and butanol; alcohol ethers such as ethylene glycol monomethyl ether and ethylene glycol monoethyl ether as well as their acetic esters; ethers such as diethyl ether and tetrahydrofuran; esters such as ethyl acetate, propyl acetate and butyl acetate; ketones such as acetone, methyl ethyl ketone, methyl isobutyl ketone, cyclohexanone and isophorone; chlorinated hydrocarbons such as trichloroethylene, tetrachloroethylene and 1,1,1-trichloroethane; and polar solvents such as dimethylformamide and dimethylsulfoxide. They may be used alone or in the form of a mixture thereof. Further, examples of the reactive diluents include acrylates such as the hydroxyl group-containing (meth)acrylates usable as (1)(b), 2-ethylhexyl acrylate, propylene glycol diacrylate, butylene glycol diacrylate, 1,4-butanediol diacrylate, neopentyl glycol diacrylate, 1,6-hexanediol diacrylate, butoxyethylene glycol acrylate, tetrahydrofurfuryl acrylate, cyclohexyl acrylate, benzyl acrylate, ethylcarbitol acrylate, butoxyethyl acrylate, butoxydiethylene glycol monoacrylate and glycidyl acrylate; methacrylates corresponding to the above-mentioned acrylates; (meth)acrylic compounds having no hydroxyl groups such as (meth)acrylate oligomers; and vinyl compounds such as N-vinyl-2-pyrrolidone.

In the case that the diluent having the functional groups capable of reacting with the isocyanate groups is used in this invention, the diluent is to be added after the synthesis of the component [A]. When the used diluent has no functional groups which can react with the isocyanate groups, it may be added at or after the synthesis of the component [A].

The component [C] is blended with the primer composition in such an amount that it leads to such a viscosity as to make the application work possible.

In order to facilitate the application work, the primer composition of this invention has a viscosity of, preferably, 10,000 cP or less, more preferably, 1,000 cP or less at 25° C. When the viscosity is in excess of 10,000 cP, it will be difficult to apply it on a substrate in a thin state.

For the sake of the improvement in weathering resistance, the primer composition of this invention may further include a known ultraviolet-ray absorber, antioxidant, age resister and/or the like.

The primer composition of this invention has hydroxyl groups, alkoxysilyl groups and acryloyl groups as functional groups, and either the epoxy groups included in (1)(a) or the amino groups included in [B] further remain in the primer composition in compliance with a molar ratio of their groups. Thus, to begin with, the primer composition of this invention carries out curing at a first step in the range of ambient temperature to 150° C. after its application on the glass plate, and the above-mentioned functional groups except the acryloyl groups simultaneously act on silanol groups on the surface of the glass plate in order to form a primer layer thereon which is excellent in an adhesive strength and is strong. The adhesive including a polymerization initiator and having double bonds is then filled or applied thereonto in order to allow the acryloyl groups in the primer to react with the double bonds of the adhesive, so that the curing of the primer at a second step is carried out together with the curing of the adhesive. At this time, in order to carry out the curing of the primer at a relatively low temperature for a short period of time, and for the purpose of obtaining an excellent adhesive strength, it is preferred to previously add the polymerization initiator to the primer composition. As the polymerization initiator, a thermal polymerization initiator and a photopolymerization initiator may be used. Particularly, in the case that the material to be applied and the adhesive must not be heated, or in the case that the curing should be accomplished in a short time, it is preferred that the photopolymerization initiator is employed and the curing is achieved by the irradiation of ultraviolet rays. Examples of the photopolymerization initiators include benzophenone, 2,4-dihydroxybenzophenone, 2-hydroxy-4-methoxybenzophenone, acetophenone, benzoin, benzoin ethyl ether, benzoin n-propyl ether, benzoin isopropyl ether, benzoin n-butyl ether, benzoin isobutyl ether, benzyl, 1-(4-isopropylphenyl)-2-hydroxy-2-methylpropane-1-one, 2-hydroxy-2-methyl-1-phenylpropane-1-one, benzyl sulfide, thioxanthone and 2-chlorothioxanthone.

The primer composition of this invention is first applied to the glass plate by means of, e.g., brushing or immersion and is then allowed to stand at ambient temperature or heated at a relatively low temperature in order to accomplish curing and to thereby form a primer layer thereon. Next, any of acrylic adhesives, epoxy adhesives, urethane adhesives and other various organic adhesives having double bonds is applied thereto or filled and is then cured by heating, ultraviolet rays irradiation or electron beams irradiation to prepare a laminated product excellent in the adhesion to the glass and the adhesive.

The reason why the excellent adhesive strength can be obtained by using the primer composition of this invention is that hydroxyl groups produced by the reaction of the epoxy groups of the epoxy urethane (meth)acrylate in the composition of this invention with the amino groups of the amino group-containing alkoxysilane or its partially hydrolyzed condensate and alkoxysilyl groups of the said silane act on silanol groups on the surface of the glass plate in order to provide a strong adhesive strength between the primer layer and the glass plate, and groups having unsaturated double bonds react with groups having unsaturated double bonds of the adhesive in order to further provide an excellent adhesive strength between the primer layer and the adhesive layer.

The primer composition of this invention which is constituted as mentioned above is utilized as a primer when laminates are manufactured by applying the organic adhesive to the glass plates, and at this time, an excellent adhesion is given to both the glass plates and the adhesive. Further, the cured film thus obtained is more elastic than a cured film of a conventional epoxy resin primer, therefore it can sufficiently withstand shocks from the outside.

The present invention is illustrated by referring to the following Examples, in which parts represent all parts by weight.

EXAMPLE 1

In a reaction vessel, 388 parts of hydrogenated xylylenediisocyanate and 0.83 part of 2,6-di-tert-butyl-4-hydroxytoluene were placed, and they were heated up to 85° C. with stirring. To the resulting solution, there was added dropwise over 2 hours a mixture in which 0.42 part of dibutyltin dilaurate and 444 parts of 2-hydroxy-3-phenyloxypropyl acrylate were homogeneously dissolved. Next, a temperature of the mixture was raised up to 70° C., and 4 hours' heating and stirring were carried out in order to prepare an urethane acrylate intermediate having $2.40 \times 10^{-3}$ mole/g of unreacted isocyanato groups. While the temperature was maintained at 70° C., 738 parts of trimethylolpropane diglycidyl ether were further added thereto, and heating and stirring were then continued for 18 hours to obtain a reaction product in which a reaction ratio of the isocyanato groups was 98% or more.

After diluted 300 parts of thus obtained reaction product with 700 parts of isopropyl alcohol, to the mixture were added 9 parts of 1-(4-isopropylphenyl)-2-hydroxy-2-methylpropane-1-one and 101 parts of N-(β-aminoethyl)-γ-aminopropyltrimethoxysilane. Then, they were uniformly mixed to prepare a primer composition A.

EXAMPLE 2

In a reaction vessel were placed, in the following order, a polyisocyanate, a polymerization inhibitor, a hydroxyl group-containing (meth)acrylate, a reaction catalyst, an epoxy group-containing alcohol, a diluent, a reaction initiator and an amino group-containing alkoxysilane shown in Tables 1 and 2 below, and the process of Example 1 was repeated under conditions described in Tables 1 and 2 in order to prepare primer compositions B to E.

COMPARATIVE EXAMPLE 1

A comparative composition D' was prepared by using the same reaction product that was employed for the preparation of the primer composition D, but not using the amino group-containing alkoxysilane.

Table 1 shows blending proportions and reaction requirements for synthesizing reaction products, and Table 2 shows blending proportions for the preparation of primer compositions.

TABLE 1

| Primer composition | B | C | D | E |
|---|---|---|---|---|
| Polyisocyanate (parts) | | | | |
| Isophorone diisocyanato | 520 | | 520 | |
| Trimethylol propane (1 mole) hexamethylene diisocyanato (3 moles) adduct *1 | | 420 | | |
| Trimethylhexamethylene diisocyanato | | | | 420 |
| Polymerization inhibitor (parts) | | | | |
| 2,6-Di-tert-butyl-4-hydroxytoluene | 0.83 | 0.74 | 0.83 | 0.88 |
| Hyroxyl group-containing acrylate or methacrylate (parts) | | | | |
| 2-Hydroxypropyl acrylate | 305 | | 305 | |
| Polypropylene glycol monomethacrylate *2 | | 339 | | |
| Glycerin dimethacrylate | | | | 456 |
| Reaction catalyst (parts) | | | | |
| Dibutyltin dilaurate | 0.40 | 0.37 | 0.40 | 0.44 |
| First step dropwise addition temp. (°C.) | 60 | 70 | 60 | 60 |
| First step dropwise addition time (hr.) | 2 | 1 | 2 | 2 |
| First step reaction temp. (°C.) | 60 | 70 | 60 | 60 |
| First step reaction time (hr.) | 1.5 | 5 | 2 | 3 |
| Unreacted isocyanato groups of urethane acrylate intermediate ($10^{-3}$ mole/g) | 2.62 | 0.62 | 2.61 | 2.26 |
| Epoxy group-containing alcohol (parts) | | | | |
| Glycidol | 174 | | | |
| Pentaerythritol diglycidyl ether | | 78 | | |
| Glycerin-1,3-diglycidyl ether | | | 479 | |
| Sorbitol tetraglycidyl ether | | | | 406 |
| Second step dropwise addition temp. (°C.) | 60 | | 60 | |
| Second step dropwise addition time (hr.) | 1 | *3 | 1 | *3 |
| Second step reaction temp. (°C.) | 65 | 75 | 65 | 70 |
| Second step reaction time (hr.) | 1.5 | 5 | 2 | 3 |
| Reaction ratio of isocyanato group (%) | >98 | >98 | >98 | >98 |

Note:
*1 An ethyl acetate solution including 70% of solids.
*2 The average molecular weight was 360.
*3 The total amount was added at once.

TABLE 2

| Primer composition | B | C | D | D' | E |
|---|---|---|---|---|---|
| Reaction product (parts) | 400 | 500 | 400 | 400 | 400 |
| Diluent (parts) | | | | | |
| Ethyl acetate | | | 600 | 600 | |
| Butyl acetate | 600 | | | | |
| Toluene | | | | | 800 |
| Xylene | | 500 | | | |
| Reaction initiator (parts) | | | | | |
| 2-Hydroxy-2-methyl-1-phenylpropane-1-one | 8 | 10 | 10 | 10 | 6 |
| Amino group-containing alkoxysilane (parts) | | | | | |
| γ-Aminopropyltriethoxysilane | | | 100 | | |
| N—(3-Aminoethyl)-γ-aminopropyltrimethoxysilane | 70 | 26 | | | 51 |

EXAMPLE 3

The primer compositions A to E and the comparative composition D' prepared in Examples 1 and 2 were applied to each one surface of the glass plates having a square shape one side of which was 30 cm in length and having a thickness of 3 mm by the use of a brush, and heating was then carried out for a period of 30 minutes at 120° C. in order to prepare primer films thereon. Each glass plate and a polycarbonate plate having the same plane size as the glass plate and having a thickness of 0.5 mm were fixed in parallel by using a spacer so that the primer-applied surface of the glass plate might confront the polycarbonate plate and so that both the plates might be spaced as much as 0.5 mm, and three sides of the fixed plates were sealed with a tape, leaving the one remaining side open. The fixed plates were oriented turning up the open sides thereof, and an urethane acrylate adhesive U1 modified with a polycarbonate and an amino group-containing alkoxysilane and an epoxyacrylate adhesive U2 were each fully injected through the open sides into the spaces between the fixed plates, least air bubbles should be introduced thereinto. The resulting laminates were subjected to ultraviolet rays irradiation for 5 seconds by the use of an ultraviolet rays irradiation device equipped with a 30 W/cm output high-pressure mercury vapor lamp, with the lamp spaced as much as 15 cm from the glass plates thereof, in order to cure the adhesives, so that there were prepared glass plate-adhesive-polycarbonate plate laminates in which each primer layer was formed between the glass plate and the adhesive.

COMPARATIVE EXAMPLE 2

For comparison, glass plates which had not undergone the primer treatment were used to prepare similar laminates. For thus prepared laminates, appearance and adhesion state were observed, and shear adhesive strength and peel-off adhesive strength were measured. Furthermore, for laminates prepared in the same manner, the following tests were carried out.

(1) Boiling test: Each laminate was caused to uprightly stand in warm water of 65° C. and was immersed therein for 3 minutes, it was immersed immediately in boiling water at 100° C. for 2 hours. Appearance and the adhered state of this laminate were compared with those at room temperature, and the shear adhesive strength and the peel-off adhesive strength were measured.

(2) Heat resistance test: After the laminate was left to stand in a thermostat at 100° C. for 2 hours, comparison and measurements were conducted similarly as in (1).

These results are shown in Table 3 below.

TABLE 3

| Adhesive | Test item | No primer (Comparative) | A | B | C | D | D' (Comparative) | E |
|---|---|---|---|---|---|---|---|---|
| U1 | Normal state: | | | | | | | |
| | Appearance | Colorless | Colorless | Colorless | Colorless | Colorless | Colorless | Colorless |
| | Adhered state | Good | Good | Good | Good | Good | Good | Good |
| | Shear adhesive strength (kg/cm$^2$) | 72 | 208* | 198* | 168* | 210* | 81 | 182* |
| | Peel-off adhesive strength (kg/cm) | 3.0 | 9.0 | 8.8 | 6.2 | 9.3 | 5.3 | 7.7 |
| | Boiling test: | | | | | | | |
| | Appearance | Not changed | Not changed | Not changed | Not changed | Not changed | ** | Not changed |
| | Adhered state | Not changed | Not changed | Not changed | Not changed | Not changed | ** | Not changed |
| | Shear adhesive strength (kg/cm$^2$) | 36 | 82 | 69 | 48 | 94 | 44 | 66 |
| | Peel-off adhesive strength (kg/cm) | 0.9 | 3.5 | 2.2 | 1.4 | 3.6 | 1.1 | 1.8 |
| | Heat resistance test: | | | | | | | |
| | Appearance | Not changed | Not changed | Not changed | Not changed | Not changed | ** | Not changed |
| | Adhered state | Not changed | Not changed | Not change | Not changed | Not changed | ** | Not changed |
| | Shear adhesion strength (kg/cm$^2$) | 75 | 220* | 201* | 169* | 216* | 80 | 188* |
| | Peel-off adhesive strength (kg/cm) | 3.2 | 10.3 | 9.1 | 6.6 | 9.5 | 5.4 | 7.2 |
| U2 | Normal state: | | | | | | | |
| | Appearance | Colorless | Colorless | Colorless | Colorless | Colorless | Colorless | Colorless |
| | Adhered state | Good | Good | Good | Good | Good | Good | Good |
| | Shear adhesion strength (kg/cm$^2$) | 19 | 52 | 50 | 46 | 56 | 24 | 52 |
| | Peel-off adhesive strength (kg/cm) | 0.8 | 2.2 | 2.7 | 2.9 | 3.7 | 1.2 | 3.3 |

Note:
*The glass plate was broken.
**A partial peel-off occured between the glass plate and the primer layer.
U1: The main component was synthesized from polycarbonate diol, bisphenol A, propylene oxide, 2-hydroxypropyl acrylate, 2-ethylhexyl acrylate and isophoron diisocyanate.
U2: The main component was synthesized from bisphenol A, epichlorohydrin and acrylic acid.

For the laminates in which the adhesive U2 was used, the boiling test and the heat resistance test were carried out, and it has been found that with regard to the laminates which had not undergone the primer treatment, the adhesive layers were peeled from the glass plates and the polycarbonate plates. On the contrary, with regard to the laminates which were treated with the primer compositions of this invention, the adhesives were fully kept adhering to the surfaces of the glass plates, though they were peeled from the polycarbonate plates. With regard to the laminates treated with the comparative primer composition D', the primer layers were partially peeled from the glass plates, as in the case of the laminates in which the adhesive U1 was employed.

The above-mentioned results indicate that the laminates in which the primer compositions of this invention were used had an excellent adhesive strength.

We claim:

1. A primer composition characterized by comprising:
[A] a reaction product of:
  (1) a hydroxyl group-containing organic compound composed of;
    (a) an epoxy group-containing alcohol represented by the general formula [I]:

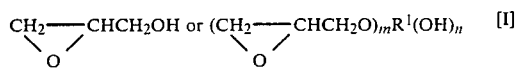

wherein, $R^1$ is a hydrocarbon group having 1 to 15 carbon atoms, or an organic group in which the same or different hydrocarbon groups are bonded to each other by an ether bond or an ester bond; and each of m and n is a value of 1 or more; and (b) a hydroxyl group-containing (meth)acrylate represented by the formula [II]:

wherein $R^2$ is a hydrogen atom or a methyl group; $R^3$ is a substituted or unsubstituted hydrocarbon group, or a group in which the same or different hydrocarbon groups are bonded to each other by ether bond or the ester bond, the $R^3$ being a-valent and having at least one hydroxyl group; and a is an integer of 1 to 3;
an amount of active hydrogen atoms included in the aforesaid (a) being 25 to 75% with respect to the total amount of active hydrogen atoms included in the aforesaid (1), and
  (2) a polyisocyanate including 70 to 100% of the theoretical amount of isocyanato groups which will react with the total amount of the active hydrogen atoms included in the aforesaid (1);

[B] an amino group-containing alkoxysilane or its partially hydrolyzed condensate having 0.5 to 1.5 amino active hydrogen atoms per epoxy group included in the aforesaid (1)(a); and

[C] a diluent.

2. The primer composition according to claim 1, wherein said (2) is glycidol.

3. The primer composition according to claim 1, wherein the $R^1$ in said (a) is an aliphatic hydrocarbon group.

4. The primer composition according to claim 1, wherein said (b) is a (meth)acrylate having one hydroxyl group in its molecule.

5. The primer composition according to claim 1, wherein said [B] is an amino group-containing alkoxysilane.

6. The primer composition according to claim 5, wherein said [B] is N-($\beta$-aminoethyl)-$\gamma$-aminopropyltrimethoxysilane.

7. The primer composition according to claim 1, wherein said composition has a viscosity of 10,000 cP or less at a temperature of 25° C.

8. The primer composition according to claim 7, wherein said composition has a viscosity of 1,000 cP or less at a temperature of 25° C.

* * * * *